Oct. 6, 1970 E. H. STEVENSON 3,531,868
SURFACE SCANNER FOR MEASURING THE COORDINATES OF POINTS ON
A THREE-DIMENSIONAL SURFACE
Filed April 18, 1968 19 Sheets-Sheet 4
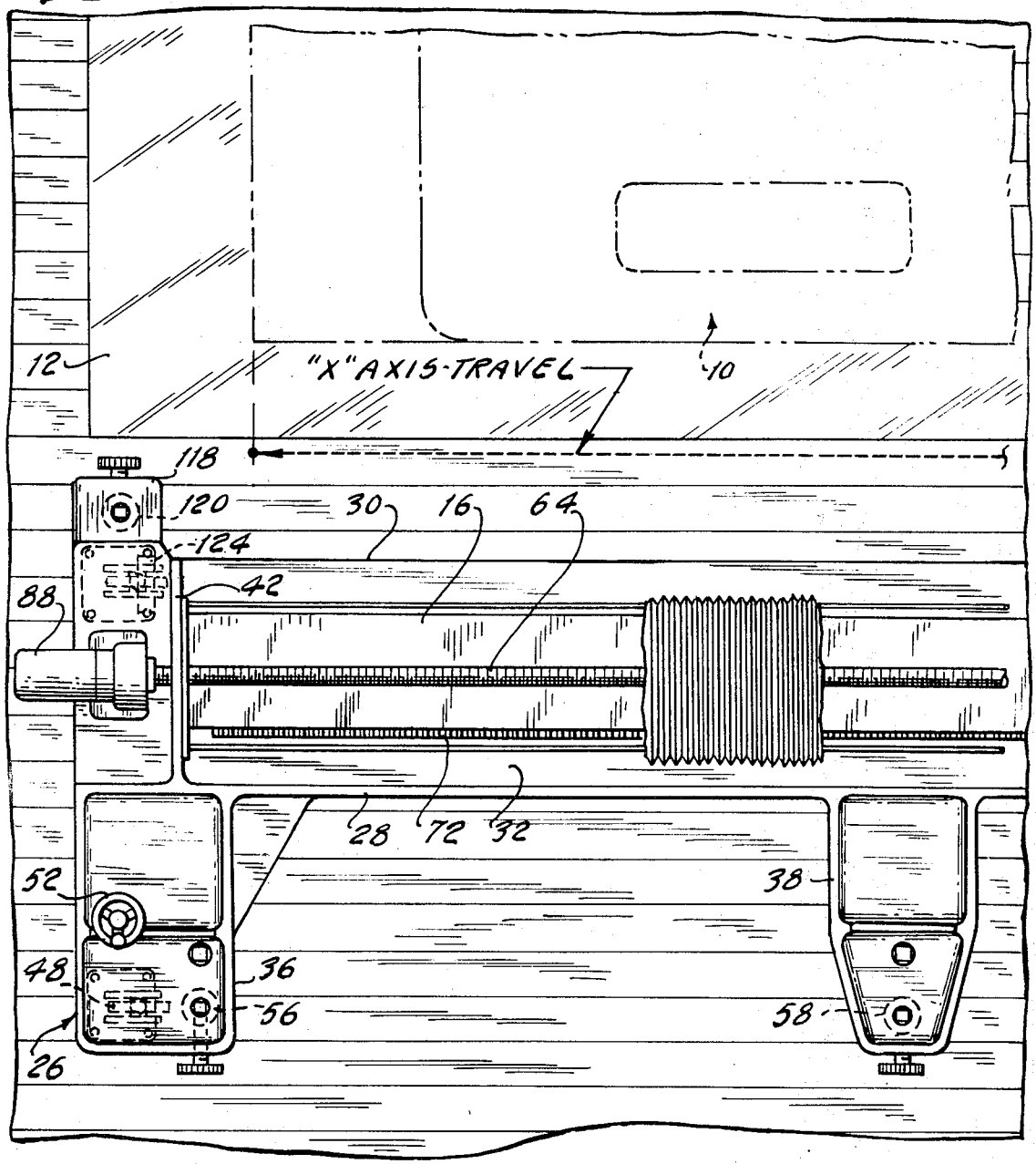
Fig.3-A
INVENTOR:
EARLE H. STEVENSON
BY
ATTORNEYS.

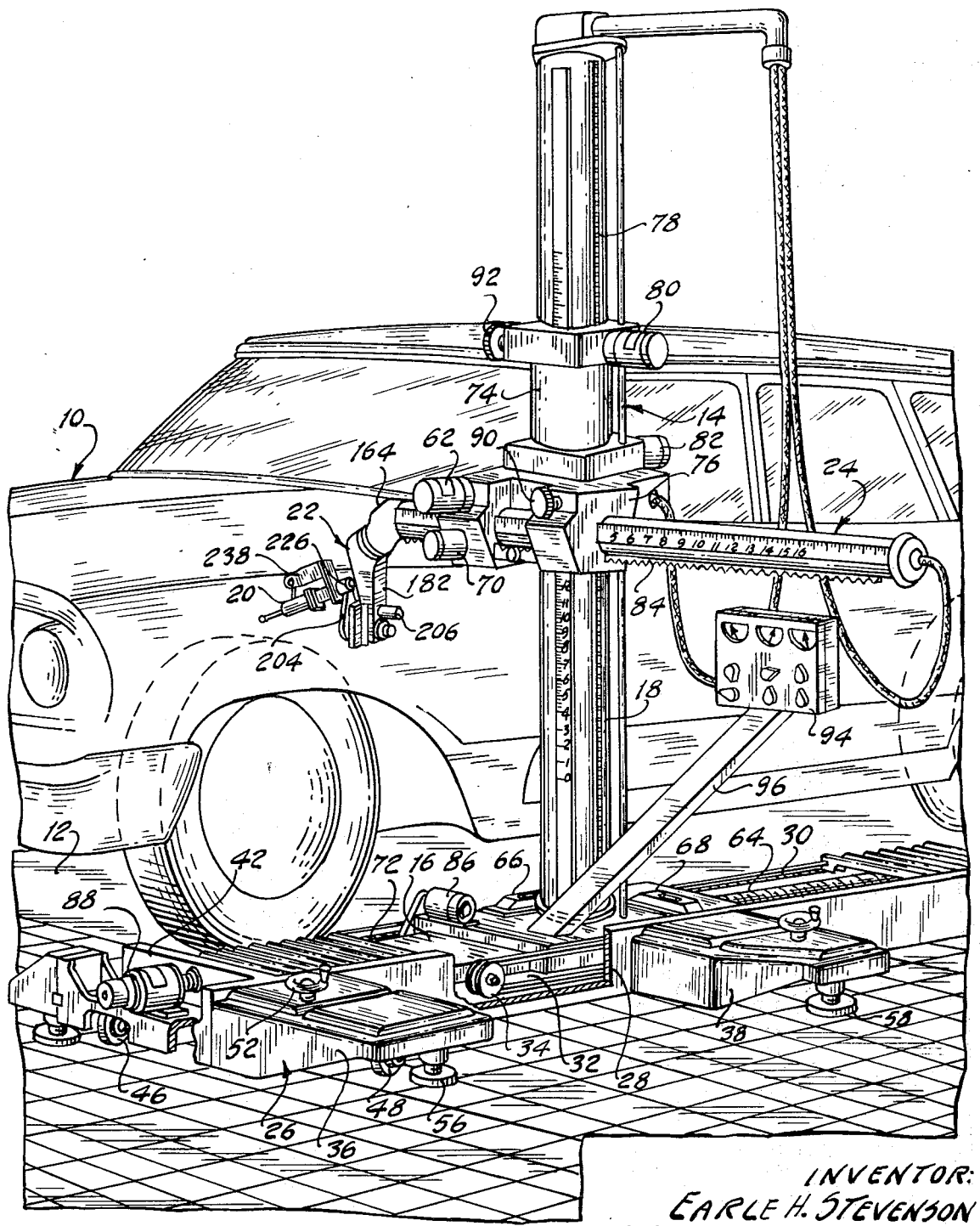

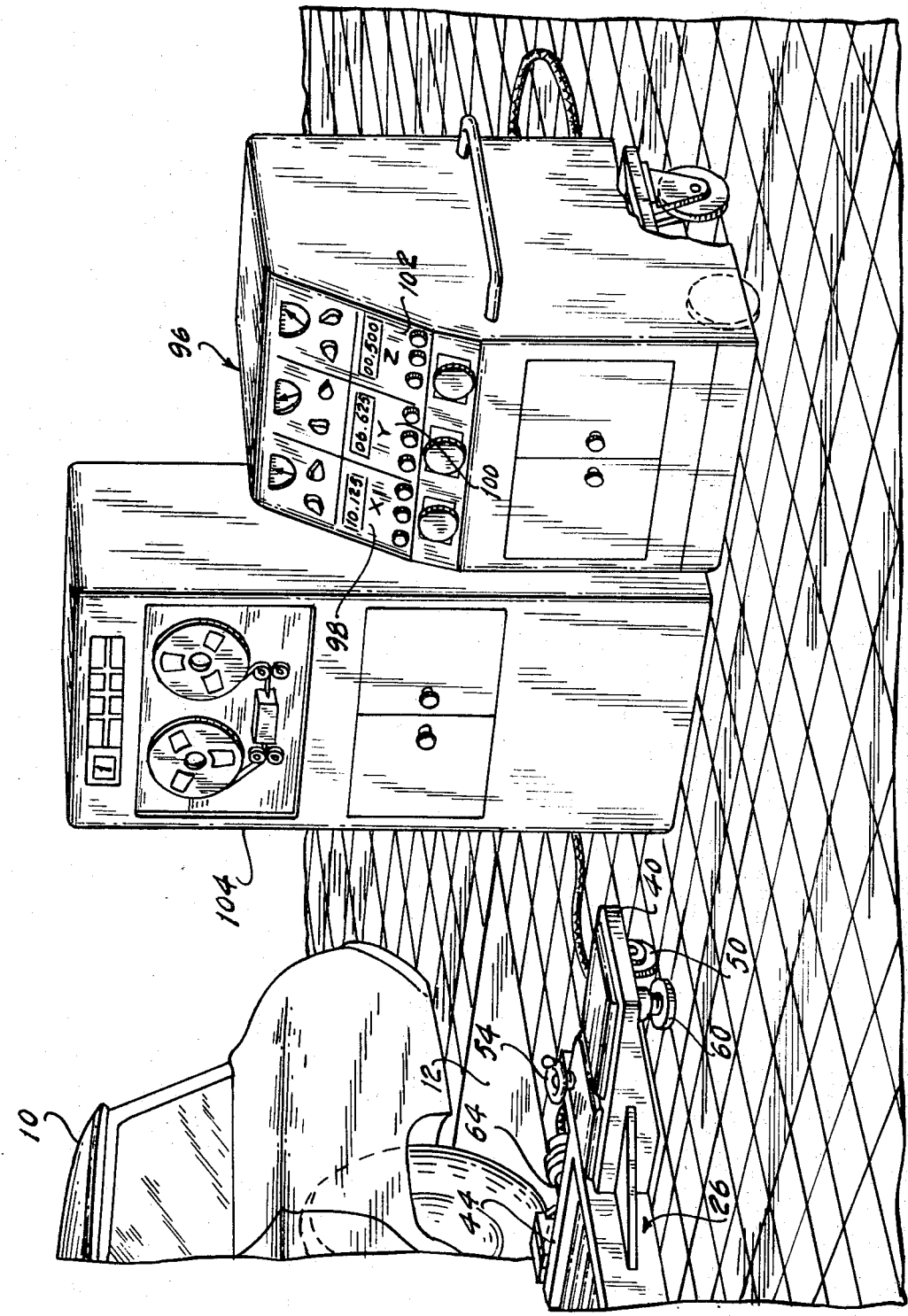

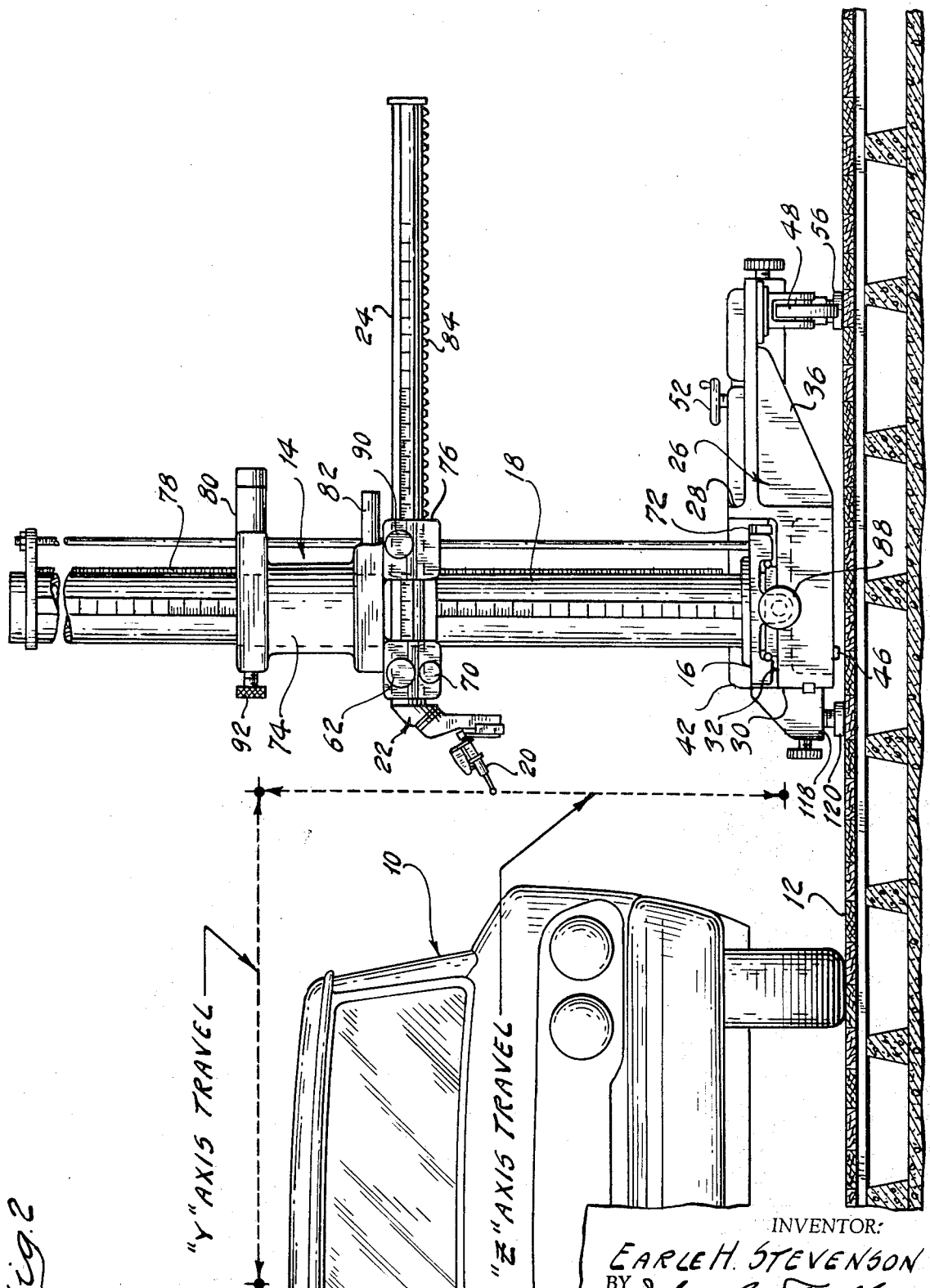

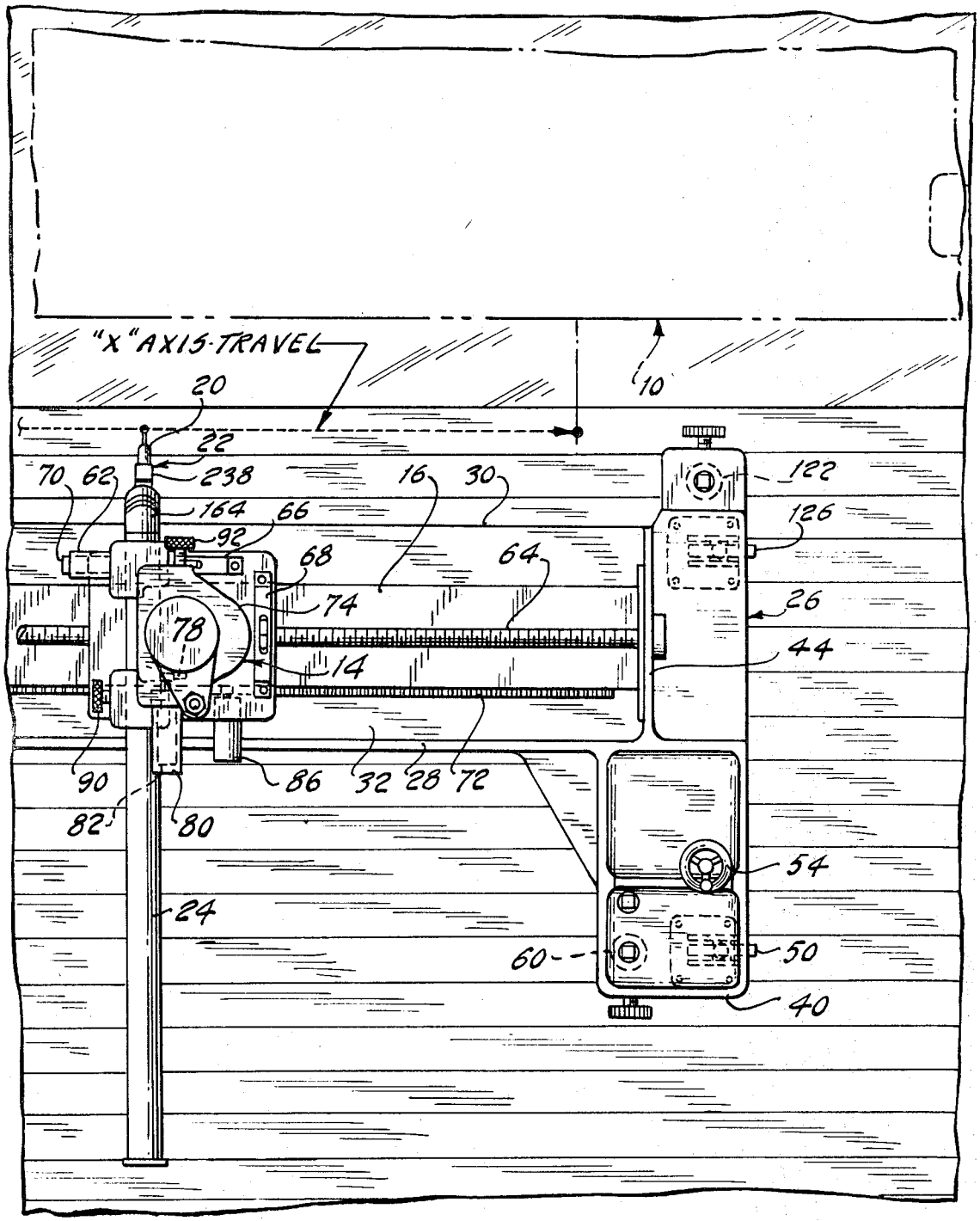

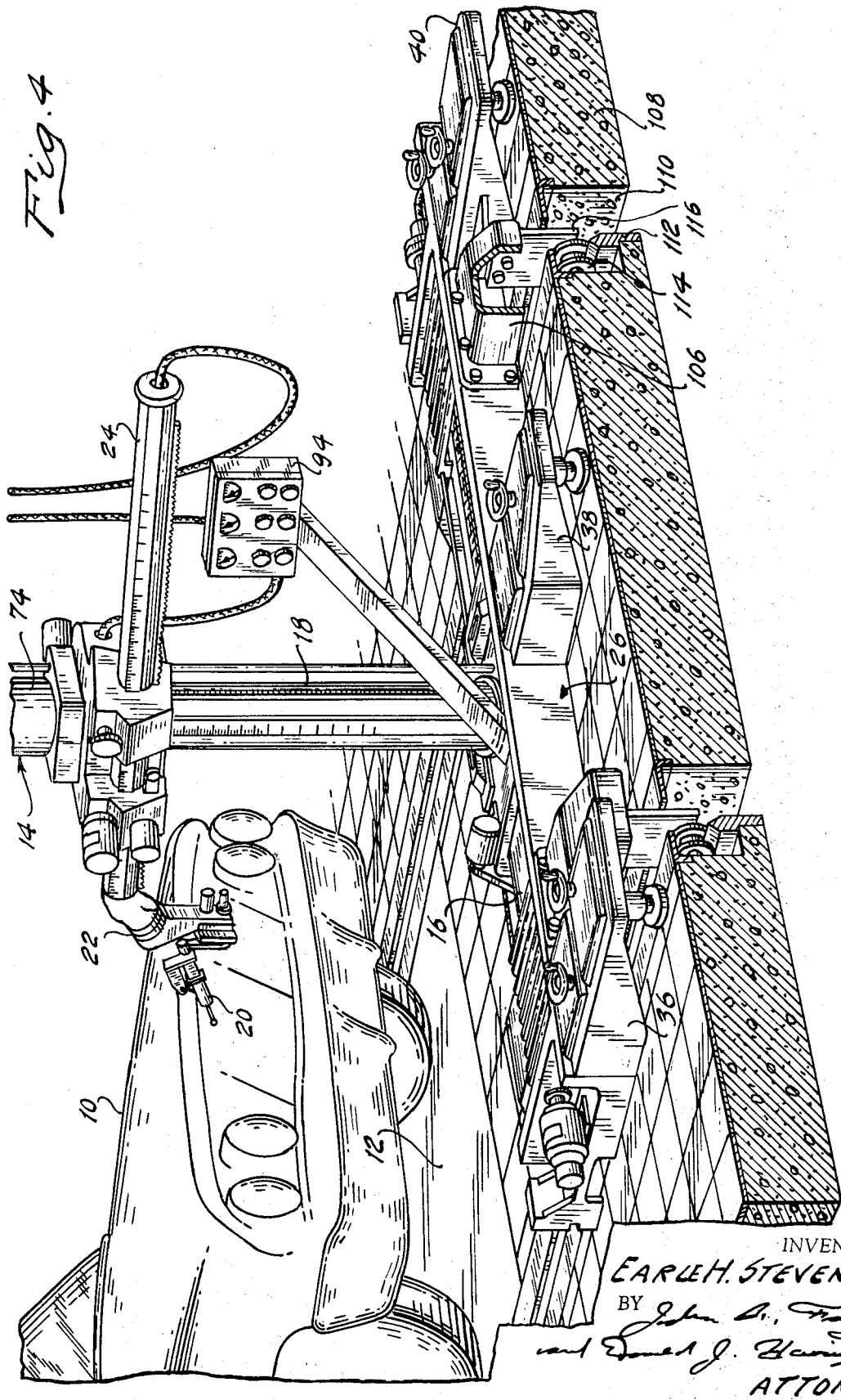

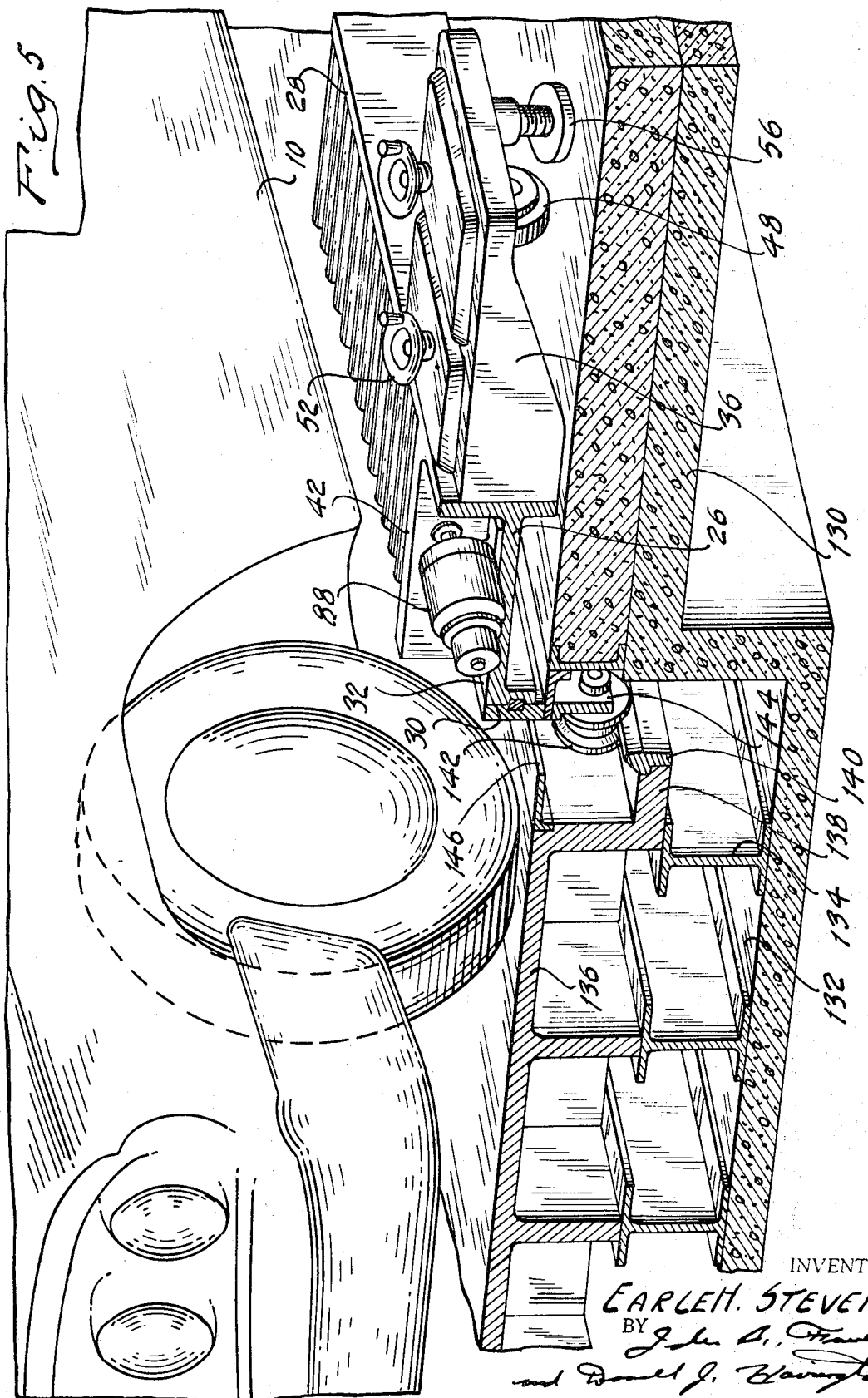

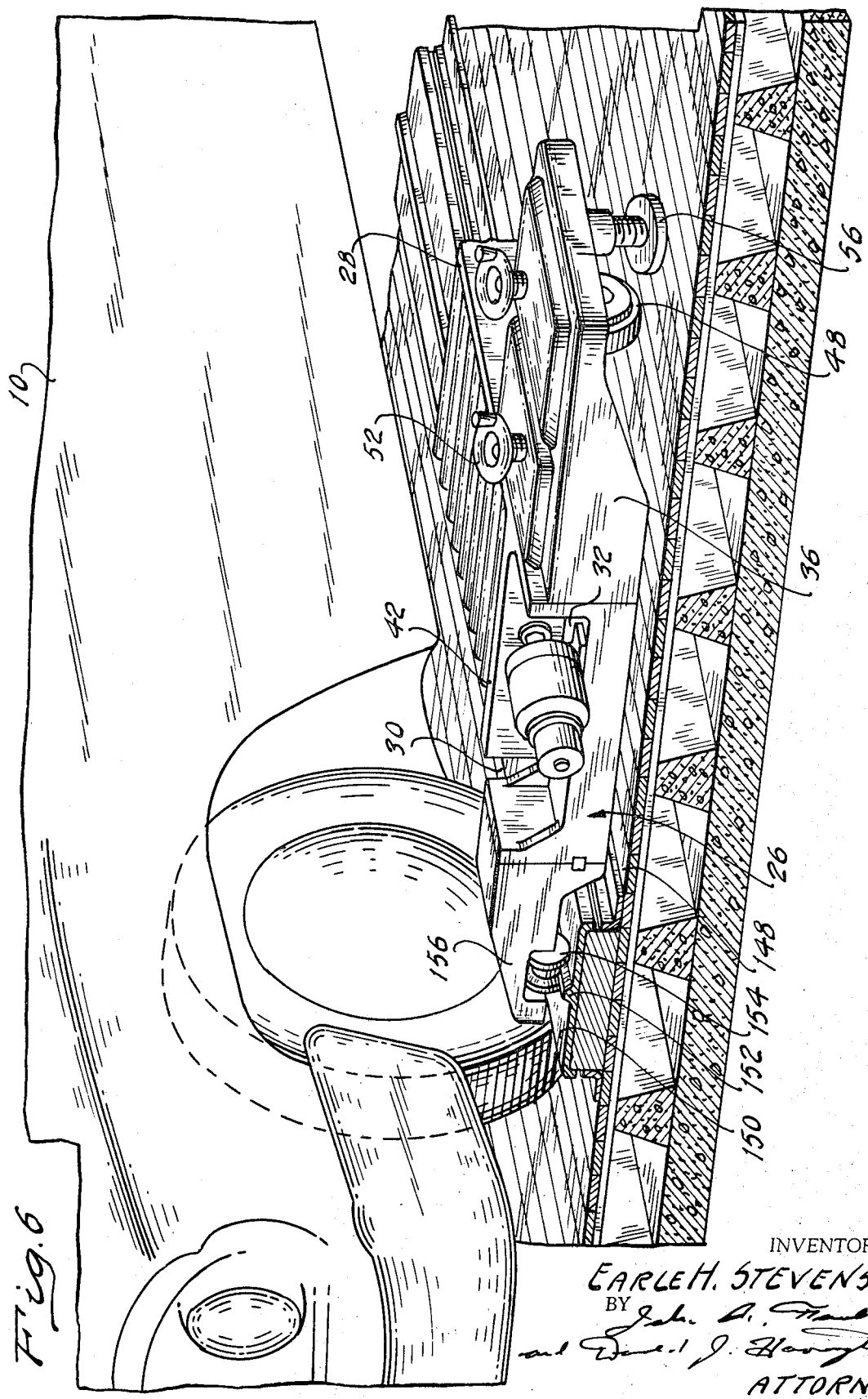

Fig. 7-A

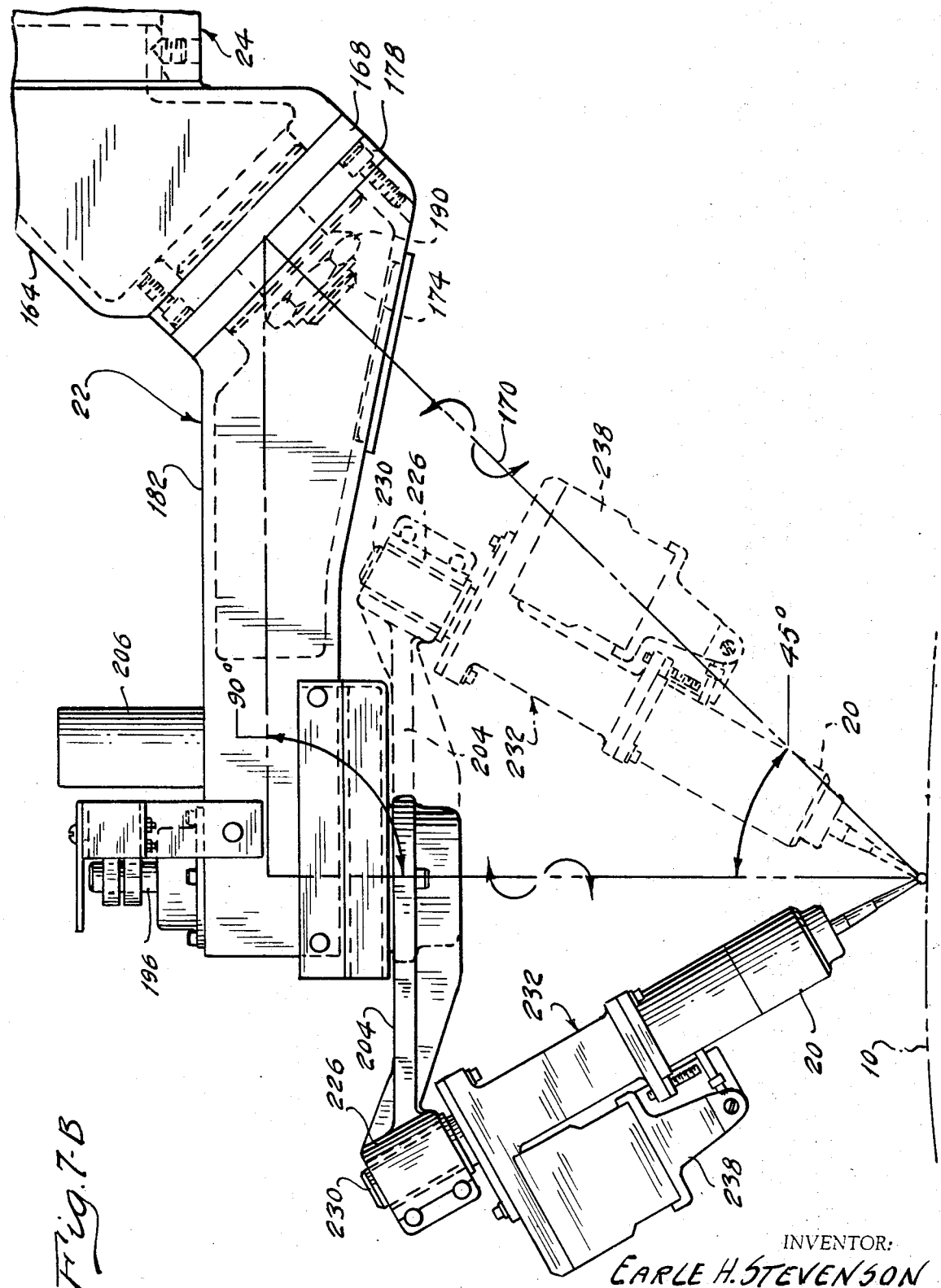

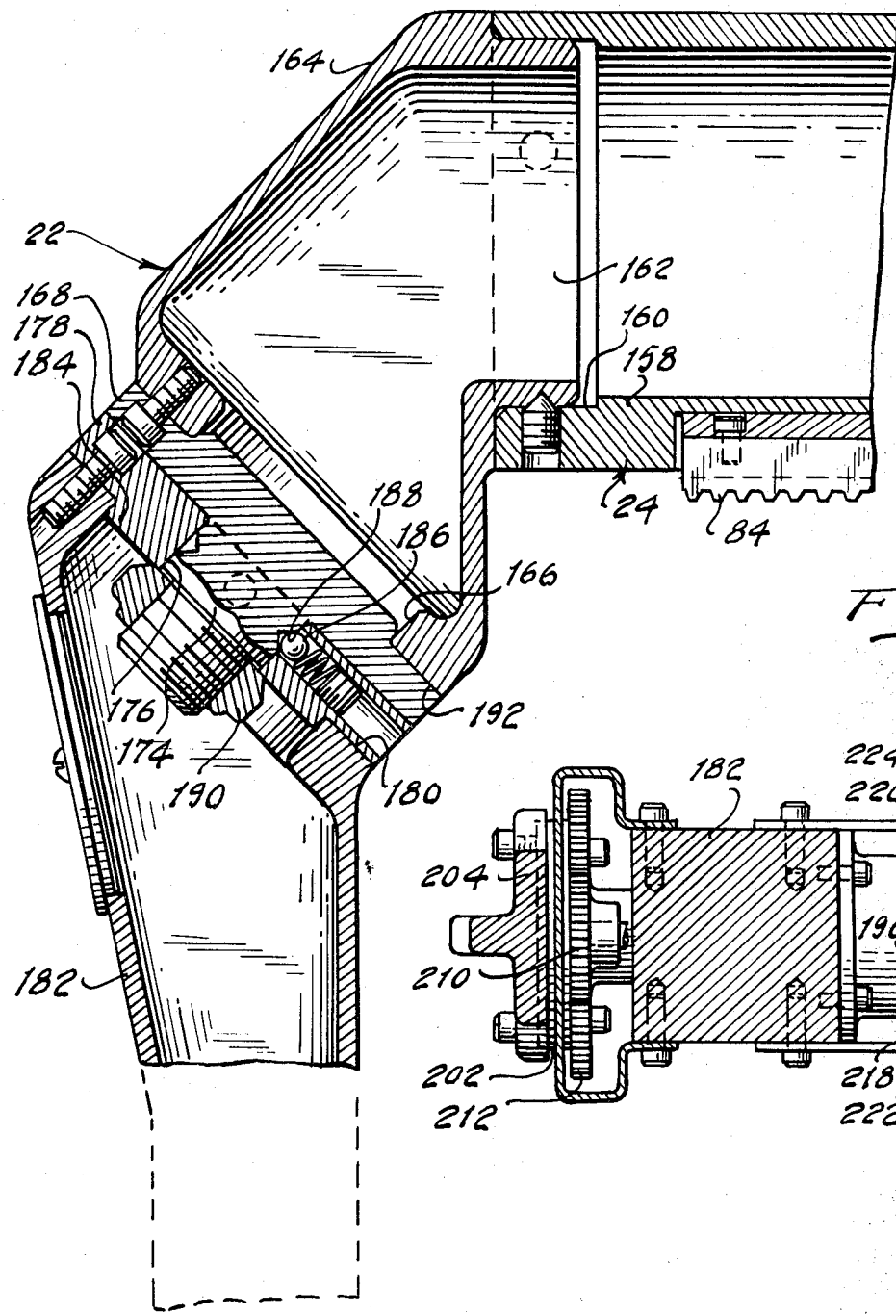

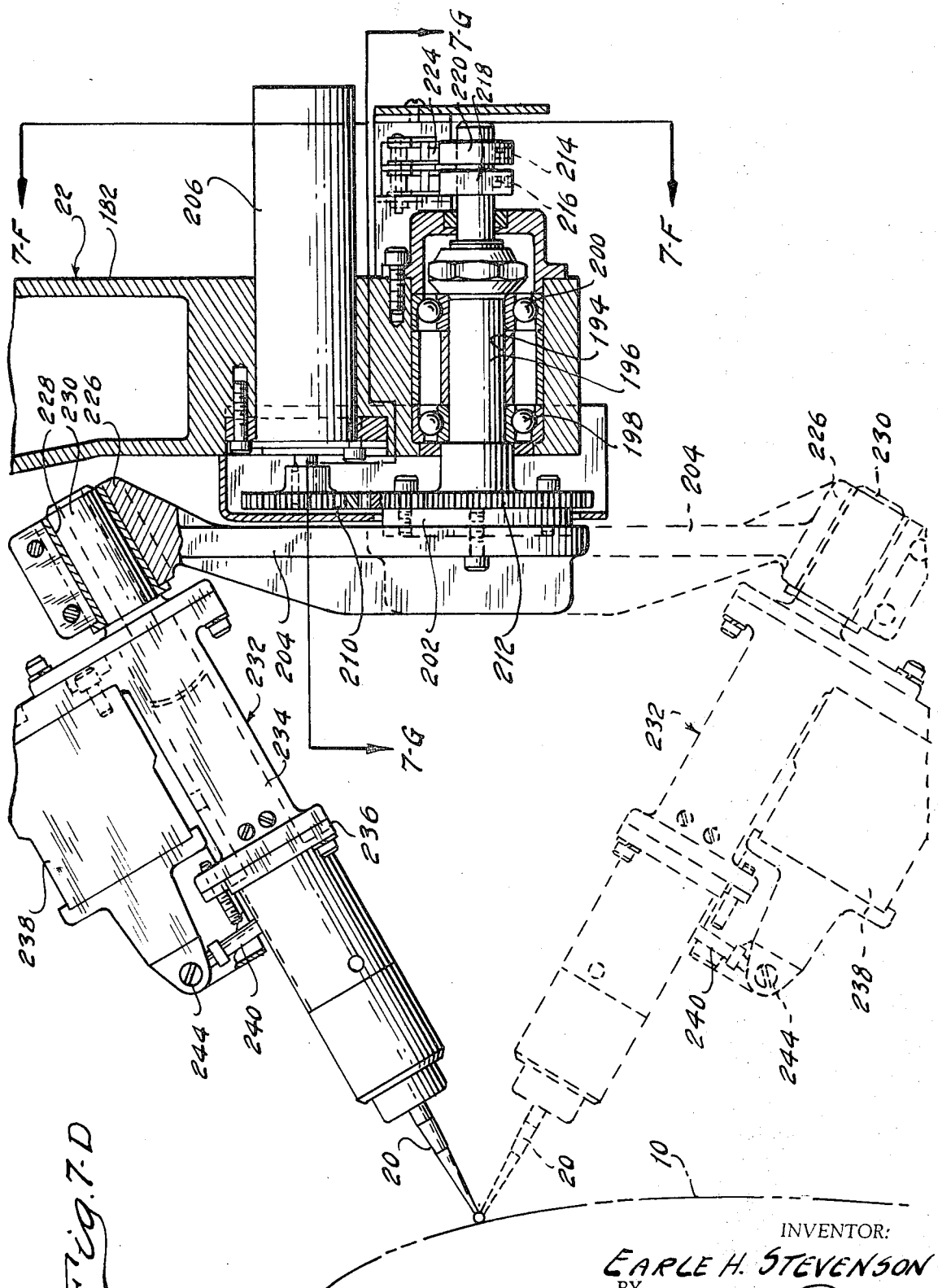

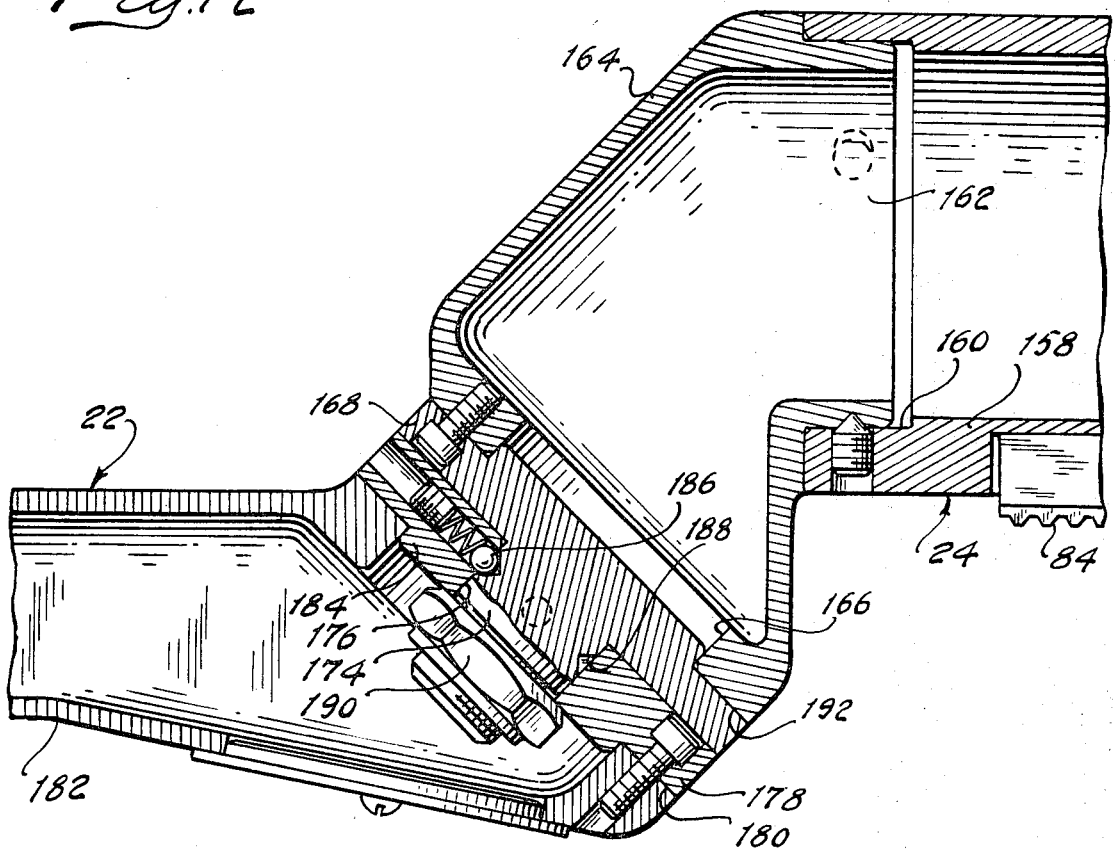
Fig. 7-E
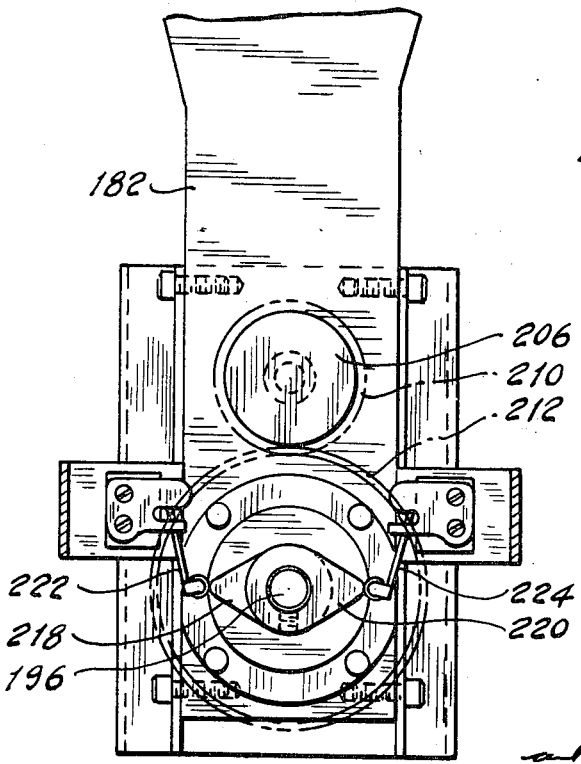
Fig. 7-F
INVENTOR:
EARLE H. STEVENSON
BY
ATTORNEYS.

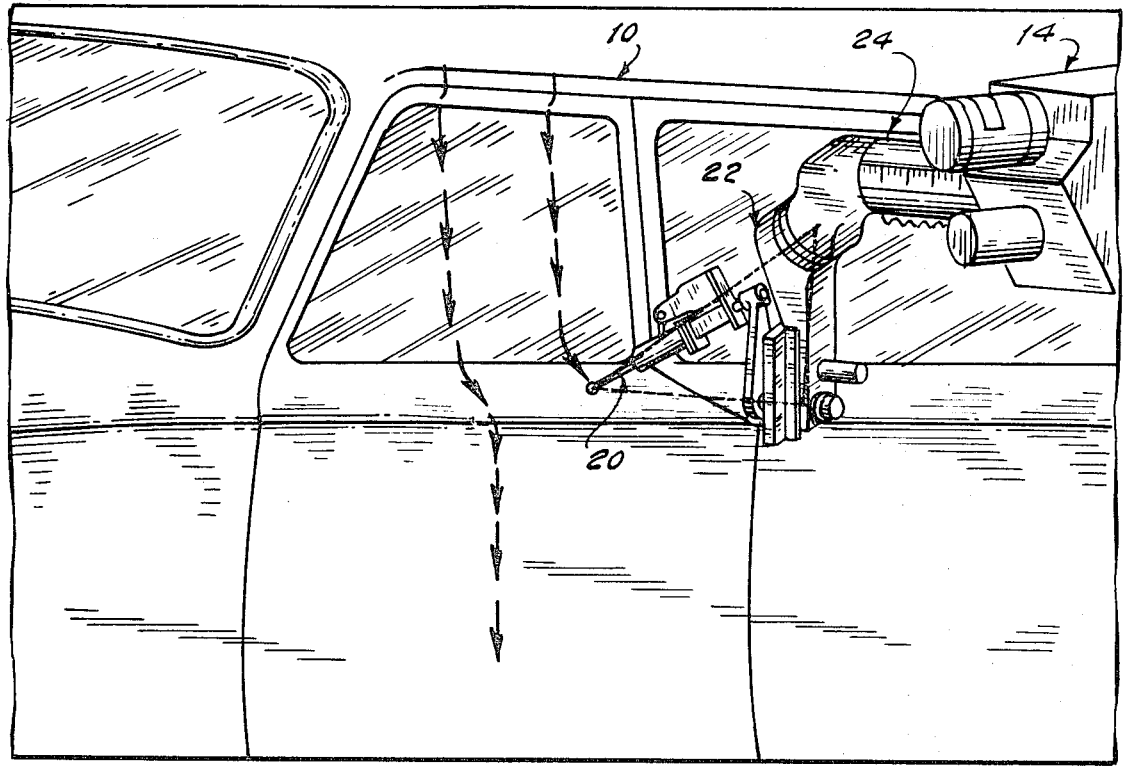
Fig.8-A
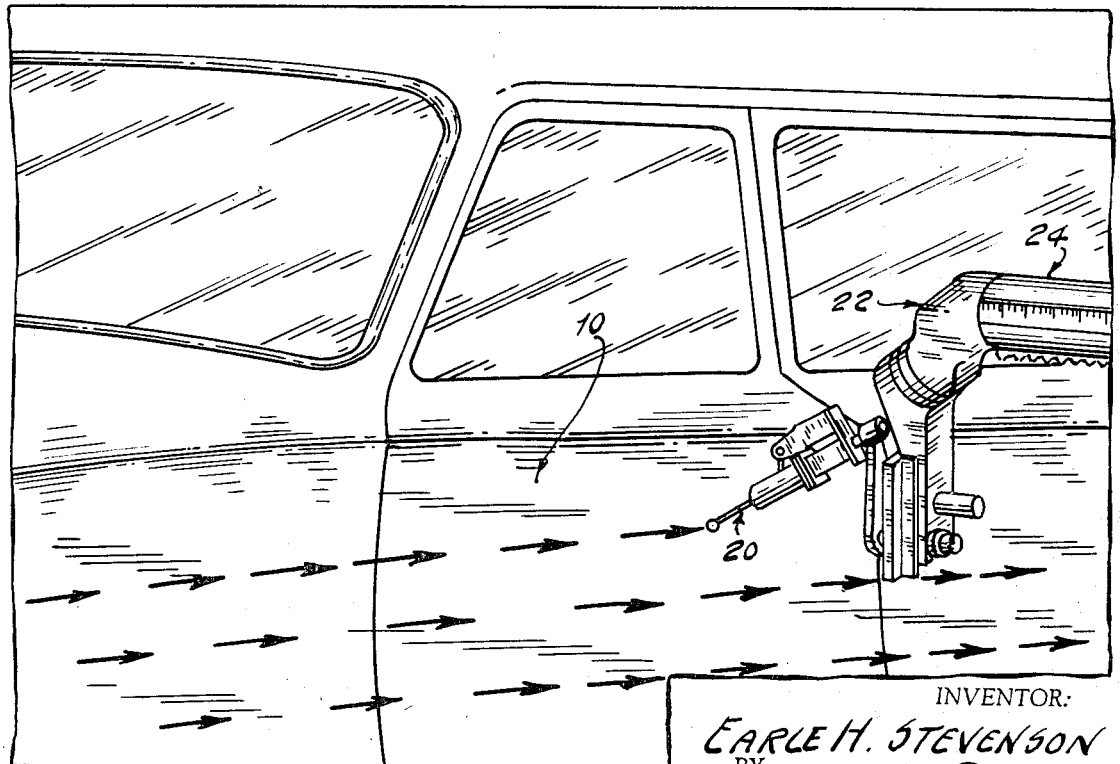
Fig.8-B

Oct. 6, 1970         E. H. STEVENSON         3,531,868
SURFACE SCANNER FOR MEASURING THE COORDINATES OF POINTS ON
A THREE-DIMENSIONAL SURFACE
Filed April 18, 1968         19 Sheets-Sheet 15
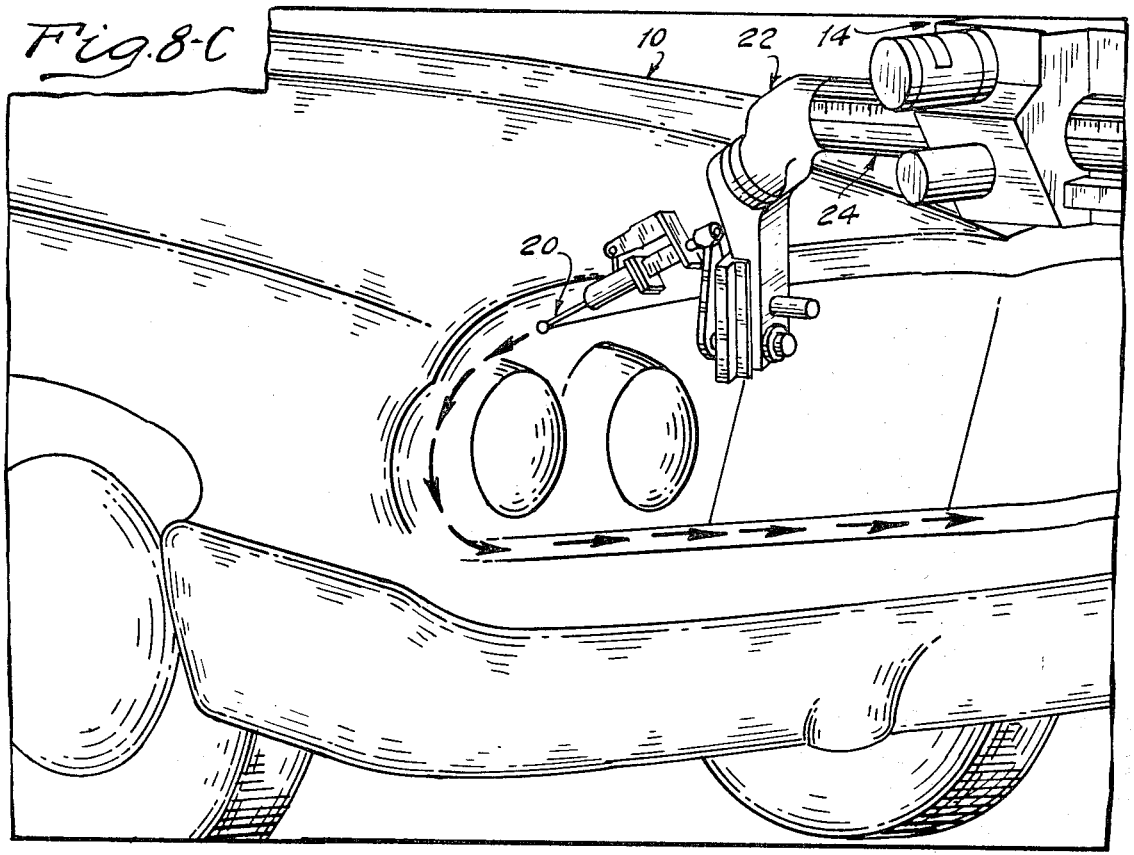
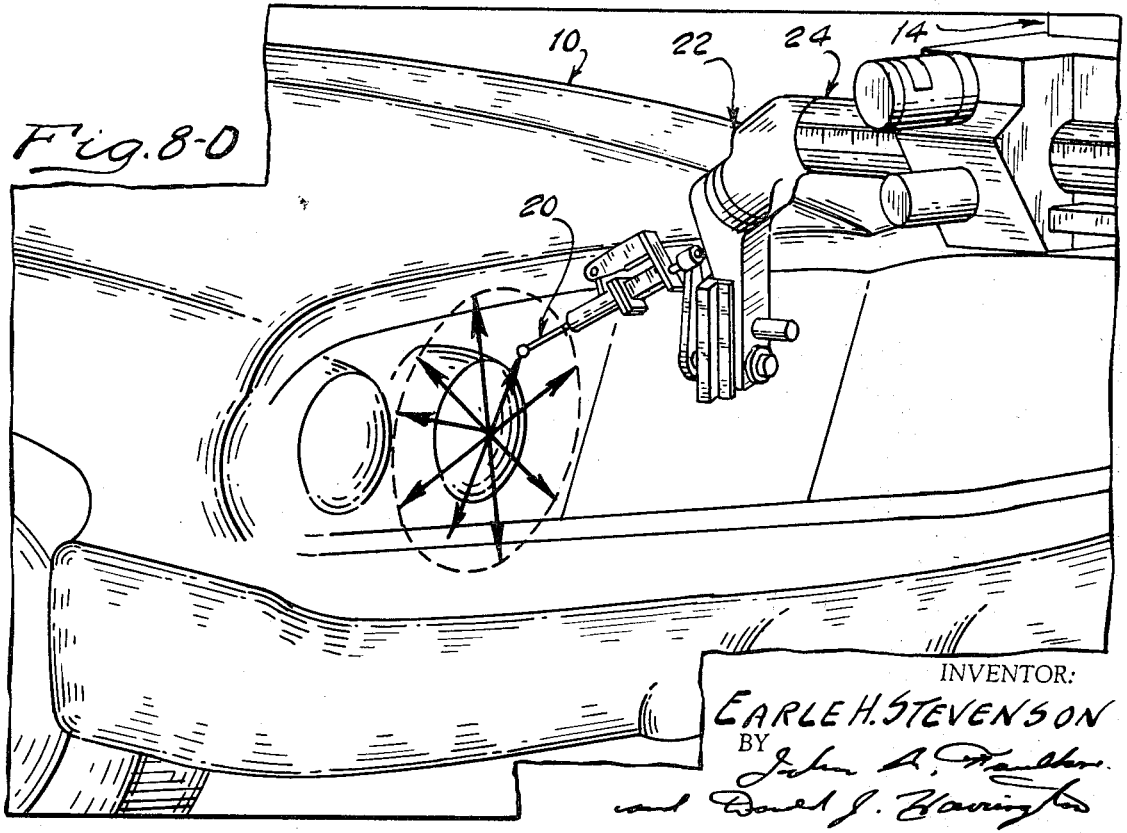
INVENTOR:
EARLE H. STEVENSON
BY
ATTORNEYS.

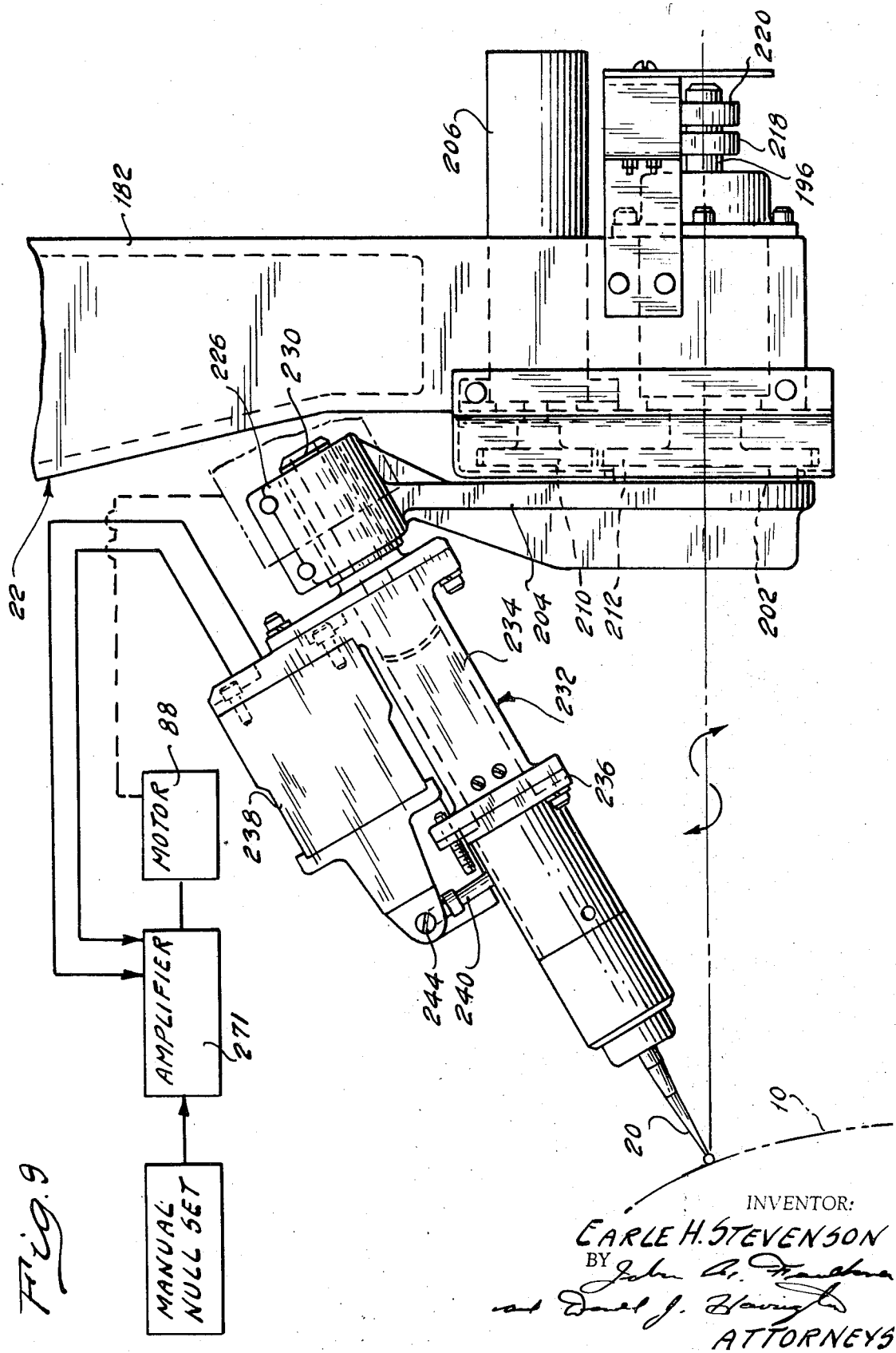

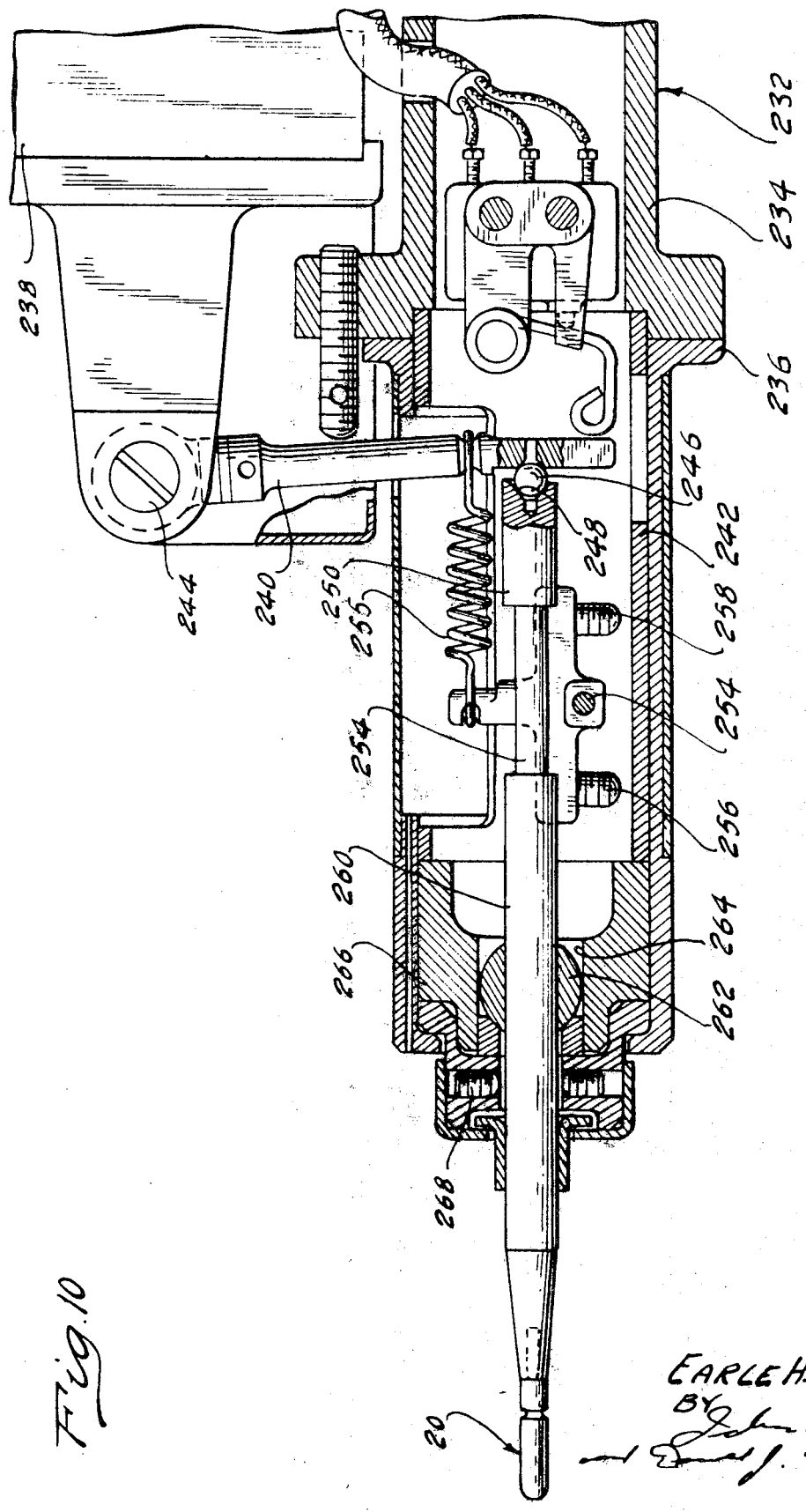

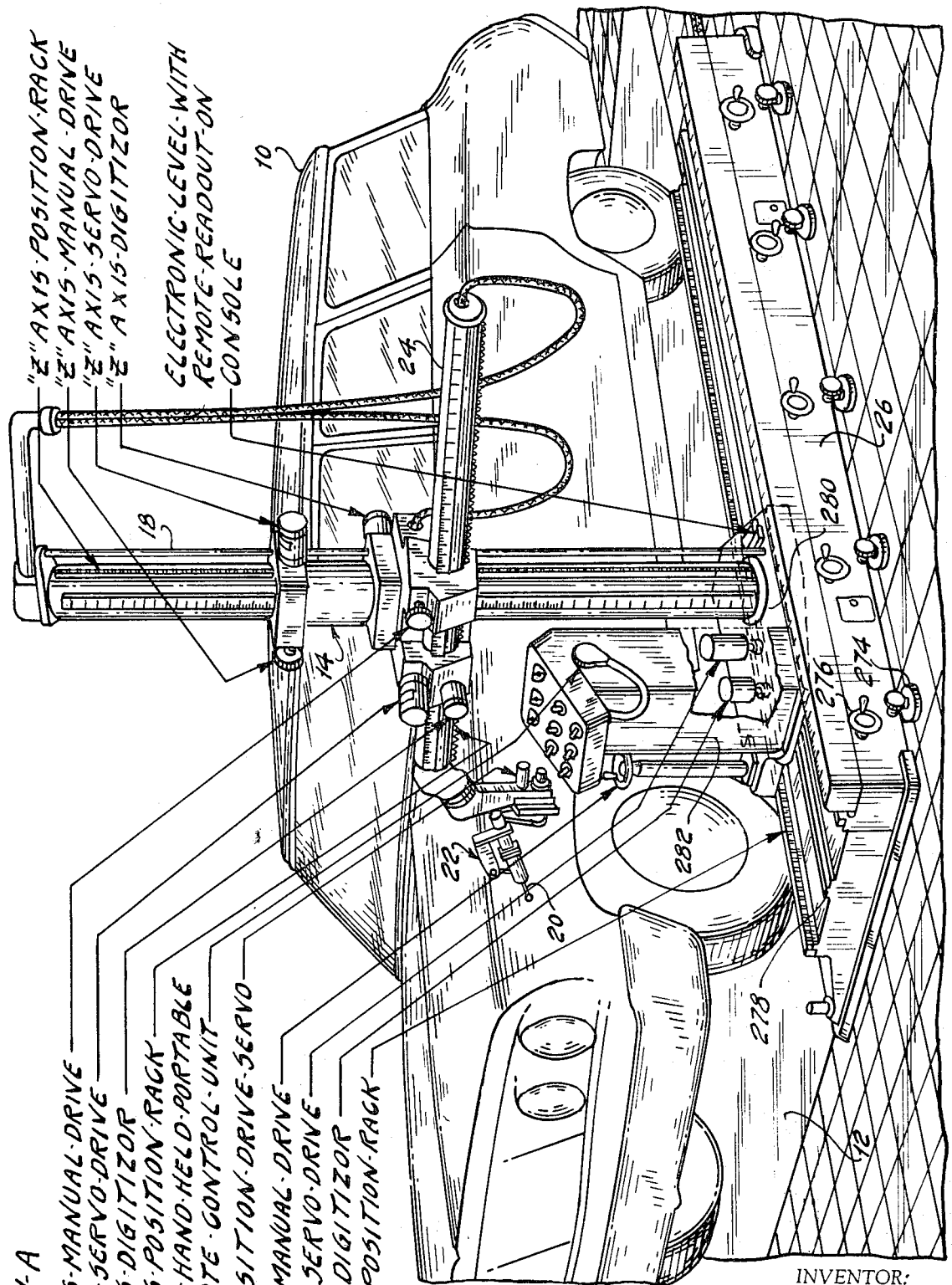

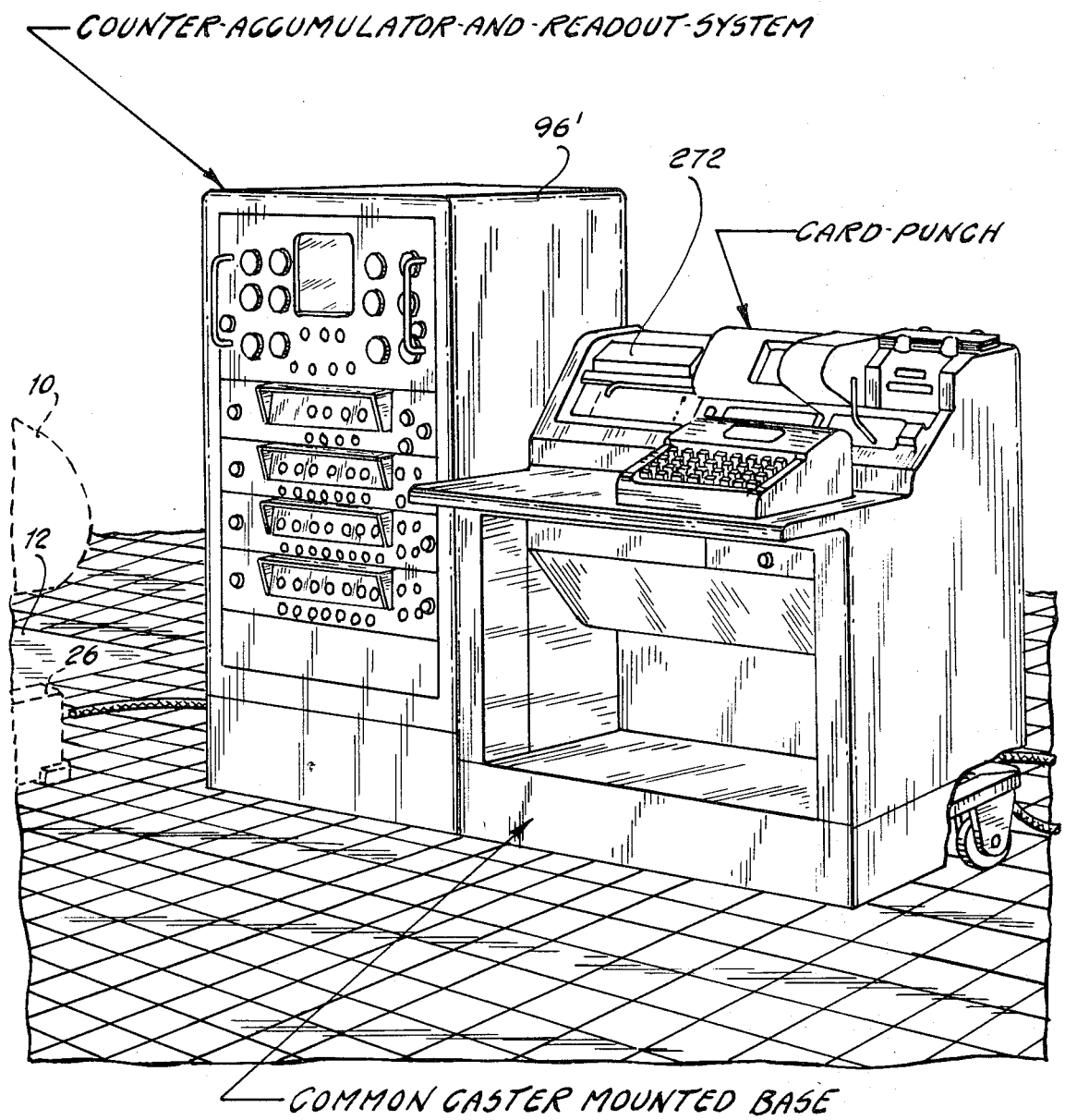

United States Patent Office 3,531,868
Patented Oct. 6, 1970

3,531,868
SURFACE SCANNER FOR MEASURING THE CO-
ORDINATES OF POINTS ON A THREE-DIMEN-
SIONAL SURFACE
Earle H. Stevenson, Detroit, Mich., assignor to Ford
Motor Company, Dearborn, Mich., a corporation of
Delaware
Filed Apr. 18, 1968, Ser. No. 722,472
Int. Cl. G01b 7/28
U.S. Cl. 33—174                            11 Claims

ABSTRACT OF THE DISCLOSURE

A multiple axis probe for measuring the coordinates of selected points on three-dimensional contours with reference to three principal reference axes wherein the probe may be adjusted with respect to any one reference axis or any combination of more than one reference axis up to five in number.

GENERAL DESCRIPTION OF THE INVENTION

My invention relates generally to a three-dimensional surface scanner system, and more particularly to a surface scanner having a surface contacting probe adapted for adjustment with respect to each of multiple reference axes as the coordinates of characteristic points on the surface are measured.

The improved surface scanner of my invention can be used in preparing three-dimensional templates and in preparations for machining three-dimensional die surfaces with arbitrary surface contours.

In machining geometric and arbitrary surface contours on dies and model surfaces, a multiple axis machine tool is used. The motion of the cutting tool is controlled by a numerical control system which receives its intelligence from a programmed tape, such as a magnetic tape or a punched paper tape. The intelligence on the tape is obtained by obtaining coordinate data along characteristic lines on a three-dimensional model of a surface corresponding to the surface to be machined. The point coordinates in three dimensions then are plotted on a two-dimensional draft plate. The data in two dimensions are scanned by a coordinatograph, which registers the coordinates of selected points by means of computer-assisted data processing steps. The two dimensional draft plate data are transferred to a numerical control tape which in turn is used as the input element for the numerical control system of the machine tool.

The improvement of my invention resides principally in the surface scanner which obtains point coordinates in the early steps of the data processing method.

In many three-dimensional surfaces for the models used in environments of this type, the contours in various surface zones vary sharply from one attitude to another. That is, the normal vectors at closely adjacent points on the surface will be at widely varying angles when a characteristic line containing such points is drawn through the surface zones. It becomes difficult to maneuver a surface scanning probe along the characteristic line when conventional surface scanner systems are used. My improved surface scanner system overcomes this difficulty, however, by providing a scanner probing head that is capable of adjustment about two additional axes in addition to the axes that are parallel to the three principal coordinate axes to which the coordinates of the measured points on the characteristic line are referred.

As the scanning probe on the surface scanner is directed along the characteristic lines on a three-dimensional surface of a model, the changes in the position of the contact point of the probe with respect to each of the three coordinate axes are measured by separate digitizers identified as the Y-axis digitizer, the Z-axis digitizer and the X-axis digitizer. The probe can be adjusted through a plurality of positions to suit any particular surface configurations without changing the location of the probe surface contacting tip with reference to the three coordinate axes. Provision is made for automatically varying the position of the probe in directions parallel to the three principal coordinate axes. The adjustment of the probe with respect to either of its other two axes will not change the position of the surface contacting tip of the probe with respect to the remaining three coordinate axes.

The means for adjusting the probe in the direction of one axis comprises in part a closed servoloop circuit. This circuit permits the probe to be advanced in the direction of a coordinate axis until contact is made between the probe tip and the surface to be measured. At that time the closed circuit will interrupt the motion of the probe in the direction of that axis and an appropriate reading of the coordinates for the point that is contacted then is recorded. At the same time the other two principal coordinates of that same point are recorded by separate readout units associated respectively with each of the other axes.

The surface-engaging probe element can be adjusted in the direction of one of three principal coordinate axes of the scanner and two additional probe adjustments can be obtained during the scanning operation, one of the adjustments being about an axis parallel to one of the coordinate axes and the other adjustment being about an axis that forms an angle with respect to each of the coordinate axes.

Automatic means is provided for adjustment of the probe in the direction of each of the three coordinate axes, at least one of the adjusting means forming a part of the aforesaid closed servoloop circuit which senses engagement of the probe tip with the measured surface. The scanner system will respond to a predetermined pressure exerted by the probe on the measured surface either to effect an adjustment of the probe toward the surface when the contacting force is less than a predetermined value or to withdraw the probe away from the surface when the contacting force is greater than that predetermined value.

BRIEF DESCRIPTION OF THE INVENTION

FIGS. 1A and 1B show in isometric form a surface scanner situated for measuring surface data on a three-dimensional clay model of an automotive vehicle.

FIG. 2 is a side elevation view, partly in section, of a portion of the structure of FIG. 1.

FIGS. 3A and 3B show a plan view of the structure in FIG. 2.

FIG. 4 shows an alternate construction for mounting the scanner assembly.

FIG. 5 shows another alternate construction for mounting the scanner assembly.

FIG. 6 shows still another alternate construction for mounting the scanner assembly.

FIGS. 7A, 7B, 7C, 7D and 7E show in enlarged form the probe head of the scanner system of my invention in various operating positions.

FIG. 7F is a sectional view taken along section line 7F—7F of FIG. 7D.

FIG. 7G is a sectional view taken along section line 7G—7G of FIG. 7D.

FIGS. 8A to 8D show in schematic form the direction of movement of the scanning head of the three-dimensional clay model along characteristic lines.

FIG. 9 shows the surface probe head used with the structure of FIG. 7.

FIG. 10 shows in longitudinal cross-sectional form a subassembly of the probe element of FIG. 9.

FIGS. 11A and 11B show a construction in which the control console and the scanner assembly are mounted on a common base.

PARTICULAR DESCRIPTION OF THE INVENTION

In FIGS. 1A and 1B, numeral 10 designates a three-dimensional model of an automotive vehicle body. By preference the model is formed of clay with a full scale. The surface can be coated with a relatively hard finish and polished. The model itself is supported on a surface plate 12.

A surface scanner is shown generally at 14. It includes a base 16 and an upright portion 18 secured to the base 16. A surface scanner probe 20 is carried by a probe head 22 supported one end by horizontal arm 24.

Base 16 forms a carriage for the upright portion 18. It is supported by a portable platform 26 having upright side walls 28 and 30 and a base plate 32.

Base carriage 16 is provided with rollers 34 which support it on the base plate 32 for movement in a Y-axis direction. For purposes of this description, the Y-axis direction is identified as the direction of the axis of arm 24 shown in FIG. 1A. The Y-axis is transverse to the plane of symmetry of the model 10. The X-axis is a horizontal line parallel to or containing the axis of symmetry of the model 10. The Z-axis is a vertical line parallel to or contained in the plane of symmetry of the model 10.

The platform 26 includes a plurality of scanner supporting brackets, as seen at 36, 38 and 40. These are secured in fixed fashion to the outer side of the wall 28.

The base plate 32 forms a trackway for the carriage 16. A wall 42 is located at one end of the trackway, and another wall 44 is located at the opposite end. A caster 46 is journaled at one end of the platform 26. This can be a swivel caster for facilitating shifting movement of the platform 26 in either the X-axis direction or the Y-axis direction. A similar caster can be provided at the other end of the platform 26.

The bracket 36 can be provided with a swivel caster 48 and the bracket 40 can be provided with a similar swivel caster 50. A retractable caster also is mounted within the bracket 36, and it can be raised and lowered by a suitable hand adjustment screw 52. A corresponding caster for the bracket 40 can be retracted and advanced by a manual adjusting screw 54.

The support pad 56 is mounted under the bracket 36 and is connected thereto by an adjusting screw. The height of the pad 56 can be adjusted as desired. Corresponding pads 58 and 60 are provided for the brackets 38 and 40, respectively. The other casters and support pads are provided on the opposite side of the platform 26 in a manner similar to that shown in the construction illustrated in FIGS. 2 and 3.

A Y-axis servo drive motor 62 drives arm 24. As motor 62 drives the arm 24, the probe head 22 is adjusted in one way or the other in a Y-axis direction.

A precision leveling instrument 66 is used for locating the upright portion 18 in a first vertical reference plane, and a corresponding precision leveling instrument 68 locates the upright portion 18 in a second vertical reference plane. These instruments can be carried by the carriage 16.

The Y-axis digitizer 70 is carried by the carriage 16 and it includes a motion input pinion, not shown, which engages the Y-axis position rack 84. As the arm 24 is moved in a Y-axis direction, digitizer 70 generates an impulse for each increment of movement. For example, it is capable of developing a single voltage impulse for each .001″ movement of the carriage 16.

The upright portion 18 extends through a sleeve 74 extending from body 76. Sleeve 74 contains suitable bearing structure, not shown, to permit vertical adjustment of the body 76 in a Z-axis direction along the upright portion 18. A Z-axis position rack 78 is formed on the upright portion 18 and engages a power input drive pinion for a Z-axis servo drive motor 80 carried by the sleeve 74. When the motor 80 is energized, the body 74 is raised or lowered. The position of the body 76 with reference to the Z-axis is determined by a Z-axis digitizer 82, which is in the form of an impulse generator that is driven by rack 78. As the body 76 moves, it is capable of developing a voltage impulse for each .001″ movement in a Z-axis direction. As the body 76 moves one way or the other, the voltage impulses can be either added or subtracted, depending upon the direction of movement.

Body 76 is formed with a horizontal opening through which arm 24 is received. Suitable bearing structure is provided in the body 76 for permitting horizontal adjustment of the arm 74 with respect to the X-axis.

Rack type gear teeth 72 are formed on the carriage 16. These engage a motion input pinion for an X-axis digitizer 86. The digitizer 86 generates impulses for each increment movement of the scanner in the X-axis direction. Electrical impulses can be added or subtracted depending upon the direction of movement.

An X-axis servo drive motor 88 is adapted to drive a rack engaging pinion to adjust the X-axis position of the arm 24. A manual adjustment of the arm 24 can be obtained by means of a manual drive wheel 90, which is connected to a separate rack engaging pinion. A corresponding manual adjustment of the Z-axis position of the body 76 is obtained by a hand wheel 92, which also drives a rack engaging pinion.

The probing element 20 of the probe head 22 is adapted to contact the surface of the model 10 at various positions along predetermined lines of the model. The position of the probing element can be controlled by the three servomotors from a switch console 94 which can be supported in a suitable fashion on the carriage 16. In the embodiment shown in FIG. 1, the support is in the form of a bracket 96 secured to the carriage 16 with the switch housing for the console 94 being located at its upper end.

The signals that are received from the three-position digitizers are received by an electronic counter indicated generally by reference character 97. Three separate counter circuits are provided, one for each of the digitizers. The circuits for the X=axis impulse generator and the Y=axis impulse generator and the Z=axis impulse generator are, respectively, shown schematically at 98, 100 and 102.

The counter console 97 adds and subtracts the impulses for each of three impulse generators associated with the three coordinate axes. For each point that is scanned by the scanner, the coordinates, as determined by the readings of the three subcircuits 98, 100 and 102, are registered in a storage device such as a tape type playback 104. A computer card punch machine could be used instead of the device 104 if desired. The intelligence that is stored by the device 104 then is used in the computer data processing procedures employed for preparing a control tape for a numerical control system in the machine of a finished reproduction of the model 10.

In FIG. 4 there is shown an alternate supporting structure for the scanner 14. It includes brackets bolted to the sides of the platform 26. One such bracket is identified by reference character 106. The surface 12 in the case of the FIG. 4 construction is supported on a cement floor 108 having a channel 110. Located in the channel 110 is a rail 112. A wheel 144 rides on the rail 112, and it is journalled on a bracket 115, which in turn is secured to the bracket 106. Bracket 115 is received through the channel 110 formed in the floor. A parallel channel and rail is used for supporting the other end of the platform 26. Thus the scanner can be moved in the X=axis direction when the rest pads are elevated.

As best seen in FIG. 2, the platform 26 on one side thereof is formed with a keyway 116, which receives a key that in turn secures a first pad bracket 118 to the side of the platform 26. Bracket 118 carries an adjustable rest pad 120. As seen in FIG. 3, another rest pad 122 supports the opposite end of the platform 26. A swivel caster 124 and a fixed caster 126 are used, as shown in FIG. 3, to supplement the action of the caster described with reference to FIG. 1.

In FIG. 5 I have shown an alternate surface plate construction and an alternate mounting means for the scanner. The embodiment of FIG. 5 includes a cement floor 130 having a depression 132 within which are situated I-beam supports 134 which extend in the X=axis direction. Supported by the I-beam supports 134 is a steel surface plate 136 on which the model rests. This surface plate includes a pair of flanges, one of which is shown at 138 for supporting a rail 140. Scanner supporting wheels 142 ride along the track 140. These are rotatably supported by a bracket plate 144 which is keyed or otherwise connected to one side of the platform 26', which corresponds to platform 26 of the embodiment of FIG. 1.

The bracket plate 144 extends through a longitudinal opening 146 formed in the upper surface plate.

FIG. 6 shows another means for mounting the scanner for movement in the X=axis direction. This is useful in those installations that include a wood plank floor such as that shown at 148 in FIG. 6. Mounted on the floor 148 is a bridge rail 150 having a trackway 152 which is engaged by wheels 154. These wheels are journalled rotatably in a removable bracket 156 carried by one side of the platform 26" which corresponds to the platform 26 in the embodiment of FIG. 1.

Figure 7:
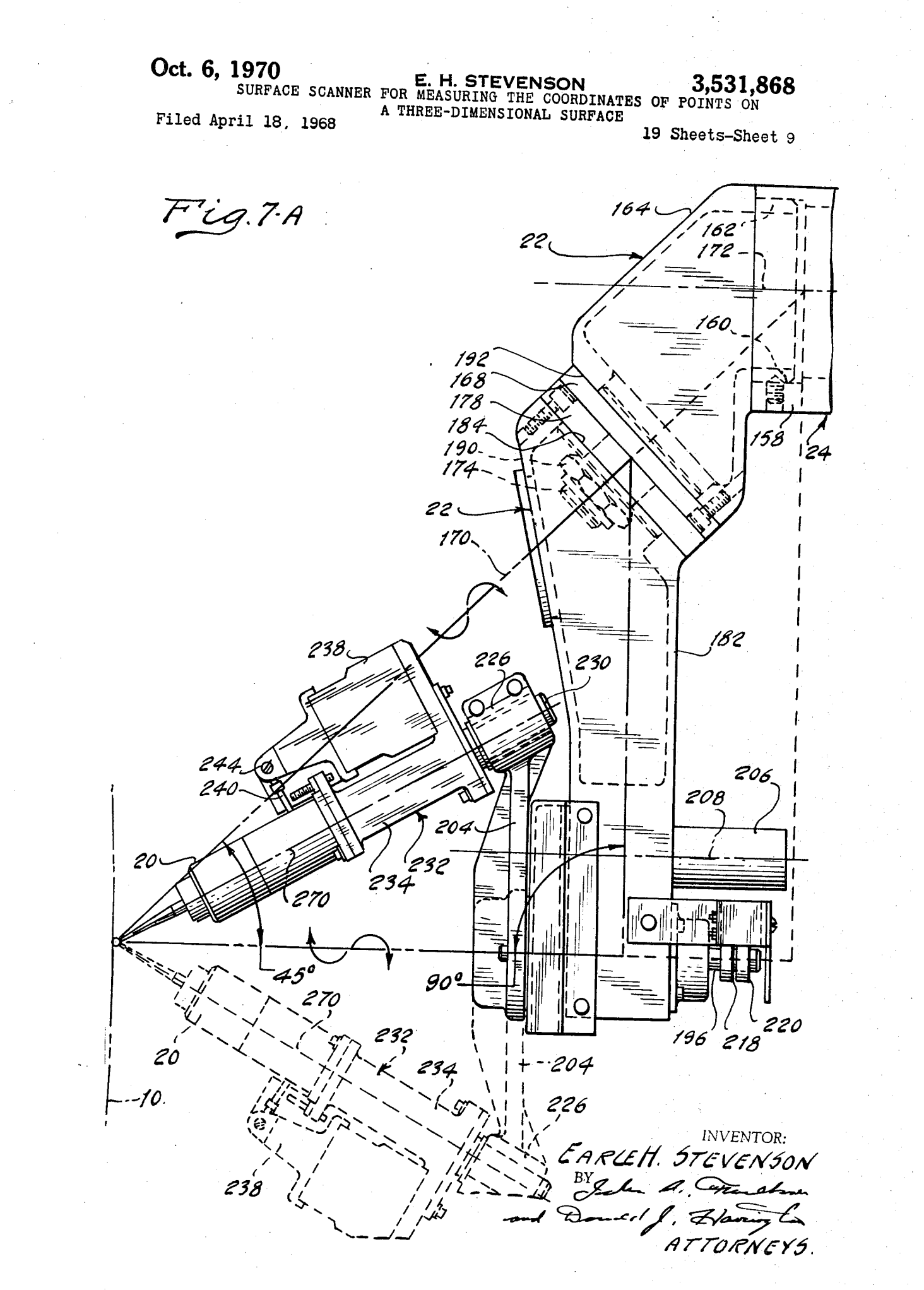

In FIGS. 7A through 7E, the end of the arm 24 is identified by reference character 158. It is formed with a circular opening 160 which receives a reduced diameter ring 162 formed on the first member 164 of the probe head 122. The probe head member 164 includes a pilot opening 166 which receives an adapter 168. The center of the opening 166 falls on a reference axis 170 which is angularly displaced with reference to a reference axis 172. Axis 172 contains the center of the pilot ring 162. The axes 170 and 172 intersect and, by preference, they form an angle of approximately 45°.

The adapter 168 has a pilot shoulder 174 which is received within a pilot opening 176 formed on the adapter 178. This adapter in turn is bolted to surface 180 formed on intermediate element 182 of the probe head 22. Adapter 178 is located by a pilot shoulder 184 carried on the adapter 178 which is received within a cooperating pilot opening in the element 182.

A spring-mounted detent element 186 is carried by adapter 178. The element 186 registers with detent openings 188 formed on the periphery of pilot shoulder 174. Shoulder 174 has a threaded extension on which is threaded a locking nut 190, which holds the elements 182 and 164 in assembled relationship. Adapter 168 is bolted to the surface 192 of the element 164.

The element 182 extends downwardly as indicated in FIG. 7A. The downward extremity of the element 182 is formed with a bearing opening. A support shaft 196 is journalled within the opening by a pair of bearings 198 and 200. The shaft 196 is formed at its left-hand end with a shoulder 202 to which is bolted a probe-supporting arm 204. The arm 204 extends perpendicularly with respect to the axis of shaft 196.

An electric motor 206 also is carried by the probe head 22. The axis of the armature of the motor 206, which is designated by reference character 208, extends parallel to the axis of shaft 196. The armature is connected at its left-hand end to a drive gear 210 as seen in FIG. 7G, which meshes with a driven gear 212 secured to the flange 202. The motor 206 thus will be effective to adjust the angular positions of the arm 204 with respect to the axis of the shaft 196.

The axis 170 intersects the axis of the shaft 196. The angle of intersection, by preference, is approximately 45°.

The degree of adjustment of the arm 204 about the axis of shaft 196 can be controlled by limit switches 214 and 216. These include cams 218 and 220 carried by the shaft 216. Each cam is adapted to engage a cam follower, as shown at 222 and 224 in FIG. 7G, respectively. These cam followers are in the form of switch elements that open and close limit switches 214 and 216. These switches form a part of the motor circuit for the armature of motor 206. The angular adjustment of the arm 204 thus can be controlled by approximately positioning the cams 218 and 220. One limit switch defines the end of the arcuate travel the arm 204 in one direction and the other switch controls the extent of movement in the opposite direction.

The arm 204 carries a mounting bracket 226 in the form of a sleeve having a circular opening 228, which receives the stem 230 of an electro-mechanical probe assembly, as indicated best in FIGS. 9 and 10 by reference character 232.

Assembly 232 includes a housing 234, as indicated in FIG. 10. This housing is flanged at 236 to permit a bolted connection with the adapter 230. Carried by the housing 234 is an electro-mechanical, linear differential transformer 238 which responds to movement of a control lever 240. The end of the control lever extends within a housing 242 which is secured to the housing 234.

The lever 240 is connected to a pivot shaft 244. The end of the lever 240 is adapted to be actuated by a ball cam element 246 which is engaged by a conical type cam 248 formed on the end of an actuator rod 250. Rod 250 is carried by a pivot element 252 mounted on the pivot shaft 254. Element 252 is biased in a clockwise direction, as viewed in FIG. 10, by a tension spring 255 connected at one end to the rod 240. Spring 254 holds the rod 240 in contact with the shaft 250. Adjustable stops 256 and 258 limit the degree of adjustment of the element 252.

The element 252 carries also a probe shaft 260 which extends through a spherical bearing element 262. The bearing element 262 is received within a cylindrical opening 264 formed in a bearing element 266, which in turn is held fast in the left-hand end of the housing. Mechanical stops 268 limit the angular adjustment of the probe shaft 260 with respect to the axis of the bearing element 262.

The outward end of the probe shaft 262 carries the probe tip 20 described previously with reference to FIG. 1.

The axis of the probe tip 20 is situated as shown in FIG. 7A at 270. This axis intersects axis 170, and the model surface contacting point on the tip 20 lies on the point of intersection of the axis 170 and the axis for shaft 196.

When the arm 24 is advanced toward the model during scanning operation, the Y-axis servo drive is energized. The arm will advance toward the model until the tip point contacts the model surface. This tends to cause deflection of the probe shaft 260 with respect to the axis of the bearing element 262. This will cause the cam element 246 to ride along the conical cam surface 248 and the actuator rod 240 will be shifted in a counter-clockwise direction, as viewed in FIG. 10 regardless of the direction of displacement of the probe tip 20. This, of course, results in rotation of the shaft 244 for the linear-differential transformer 238. The transformer can be calibrated to establish a null point when the probing pressure is at a predetermined value. If the probing pressure exceeds that value, a positive voltage signal is generated. If the probing pressure falls below that value, a negative voltage signal is developed. These signals, either positive or negative, are amplified by amplifier 271 and distributed to the servomotor 62. The motor then can be caused to advance and retract the probe tip depending upon the phase of the output of the linear-differential transformer. After the probe develops a null point pressure, the readout unit 97 will indicate the position of the point on the model which is engaged by the probe tip with reference to the three coordinate axes. The recording unit 104 then can register the coordinates of that point.

In the modified construction of FIG. 11B the recording unit is in the form of a card punch machine 272. This card punch machine receives the input signals from an electronic counter 97', as in the previous embodiment.

FIG. 11A shows a modified platform 26. It includes a plurality of manually-adjustable supporting feet, one of which is indicated at 274. The manual adjusting mechanism for the foot 274 is shown at 276.

The surface of the platform has guideways 278 which support carriage 280 of the scanner assembly. Carriage 280 supports also a modified form of control console 282, which performs the function of the console 94 shown in the embodiment of FIG. 1A. The other features of the construction shown in FIGS. 11A and 11B that have counterpart components in the FIG. 1A and FIG. 1B construction have been identified by similar reference characters.

An optimum probe tip attitude with respect to the model surface can be maintained at all times during the scanning operation simply by adjusting the probe tip about either axis 170 or the axis for shaft 196, or both, regardless of the adjustment that takes place. The point of intersection of these axes does not change. This is the point of contact with the model surface. Adjustment of the probe tip with respect to axis 270 or with respect to the axis of the shaft 196 has no effect on the coordinate readings for the points with respect to the three coordinate axes. By using this arrangement, it is possible to obtain coordinate readings on characteristic lines on the model surface in those regions where the contour undergoes extreme reversals or changes in direction. Continuous readings can be made throughout the entire extent of the characteristic line regardless of the particular surface contour changes that occur along the line.

In FIGS. 8A to 8D, I have illustrated typical scanning operations that may be made. It can be observed from these FIGS. 8A to 8D that the attitude of the probe tip with respect to the surface of the model at any point on the model is substantially unchanged regardless of changes in the contours that may be experienced along the characteristics lines. The characteristic lines over which the probe passes are illustrated by directional arrows.

Having thus described preferred forms of my invention, what I claim and desire to secure by U.S. Letters Patent is:

1. An electro-mechanical scanner for registering coordinates of points on characteristic lines formed on a three-dimensional surface comprising an arm, a probe head carried by said arm, said arm being adapted for adjustment in the direction of a first coordinate axis, an arm support, means for adjustably mounting said arm support, said arm support being adapted to move in a direction parallel to the direction of a second coordinate axis and to move also in a direction parallel to the direction of a third coordinate axis, said probe head comprising a mounting portion, a first adjustable portion carried by said mounting portion and mounted for rotary movement thereon about an axis that intersects the axis of said arm, a second adjustable portion rotatably mounted on said first adjustable portion for angular movement with respect to said first adjustable portion about another axis, a probe element carried by said second adjustable portion including a probe tip and having a characteristic axis that intersects the axis of adjustment of said first adjustable portion, said probe tip being adapted to engage said three-dimensional surface at a point that is located at the intersection of the axis of adjustment of said first adjustable portion and the axis of adjustment of said second adjustable portion.

2. The combination as set forth in claim 1 wherein said second adjustable portion comprises a servomotor, and a geared connection between said servomotor and said second adjustable portion whereby the second adjustable portion can be rotated about its axis independently of the adjustment of said first adjustable portion with respect to its axis.

3. The combination as set forth in claim 1 wherein said mounting portion comprises an adapter mounted by said arm for rotary adjustment about an axis parallel to said first coordinate axis, the axis of adjustment of said second adjustable portion being parallel to the axis of adjustment of said mounting portion.

4. The combination as set forth in claim 2 wherein the axis of said probe element intersects the axis of adjustment of said first adjustable portion and forms an angle with respect to the axis of adjustment of said second adjustable portion, said intersection point being located at the point of contact of said probe element and said surface.

5. The combination as set forth in claim 3 wherein the axis of said probe element intersects the axis of adjustment of said first adjustable portion forms an angle with respect to the axis of adjustment of said second adjustable portion, said intersection point locating the point of contact of said probe element and said surface.

6. The combination as set forth in claim 3 wherein the axis of adjustment of said first adjustable portion intersects the axis of adjustment of said mounting portion.

7. The combination as set forth in claim 1 wherein said scanner includes a closed servoloop system comprising a servomotor means for adjusting said arm and said probe head in a direction parallel to said first coordinate axis, a linear-differential transformer adapted to develop a voltage signal in response to mechanical movement of an input element thereof in each of two directions of adjustment, said differential transformer being connected electrically to said servomotor means and a mechanical connection between said probe element and said differential transformer whereby changes in the probing pressure of said probe element on said surface result in positive and negative voltage signals on said transformer.

8. The combination as set forth in claim 2 wherein said scanner includes a closed servoloop system comprising a servomotor means for adjusting said arm and said probe head in a direction parallel to said first coordinate axis, a linear differential transformer adapted to develop a voltage signal in response to mechanical movement of an input element thereof in each of two directions of adjustments, said differential transformer being connected electrically to said servomotor means and a mechanical connection between said probe element and said differential transformer whereby changes in the probing pressure of said probe element on said surface result in positive and negative voltage signals on said transformer.

9. The combination as set forth in claim 3 wherein said scanner includes a closed servoloop system comprising a servomotor means for adjusting said arm and said probe head in a direction parallel to said first coordinate axis, a linear differential transformer adapted to develop a voltage signal in response to mechanical movement of an input element thereof in each of two directions of adjustment, said differential transformer being connected electrically to said servomotor means and a mechanical connection between said probe element and said differential transformer whereby changes in the probing pressure of said probe element on said surface result in positive and negative voltage signals on said transformer.

10. The combination as set forth in claim 4 wherein said scanner includes a closed servoloop system comprising a servomotor means for adjusting said arm and said probe head in a direction parallel to said first coordinate axis, a linear differential transformer adapted to develop a voltage signal in response to mechanical movement of an input element thereof in each of two directions of adjustment, said differential transformer being connected electrically to said servomotor means and a mechanical connection between said probe element and said differential transformer whereby changes in the probing pressure of said probe element on said surface result in positive and negative voltage signals on said transformer.

11. The combination as set forth in claim 5 wherein said scanner includes a closed servoloop system comprising a servomotor means for adjusting said arm and said probe head in a direction parallel to said first coordinate axis, a linear differential transformer adapted to develop a voltage signal in response to mechanical movement of an input element thereof in each of two directions of adjustment, said differential transformer being connected electrically to said servomotor means and a mechanical connection between said probe element and said differential transformer whereby changes in the probing pressure of said probe element on said surface result in positive and negative voltage signals on said transformer.

References Cited

UNITED STATES PATENTS 3,078,583  2/1963  Chase et al.
3,250,012  5/1966  Hilton et al.

SAMUEL S. MATTHEWS, Primary Examiner